Dec. 31, 1940.                H. BUCHANAN                 2,226,894
                              FENDER SHIELD
                          Filed Oct. 8, 1938          3 Sheets-Sheet 1
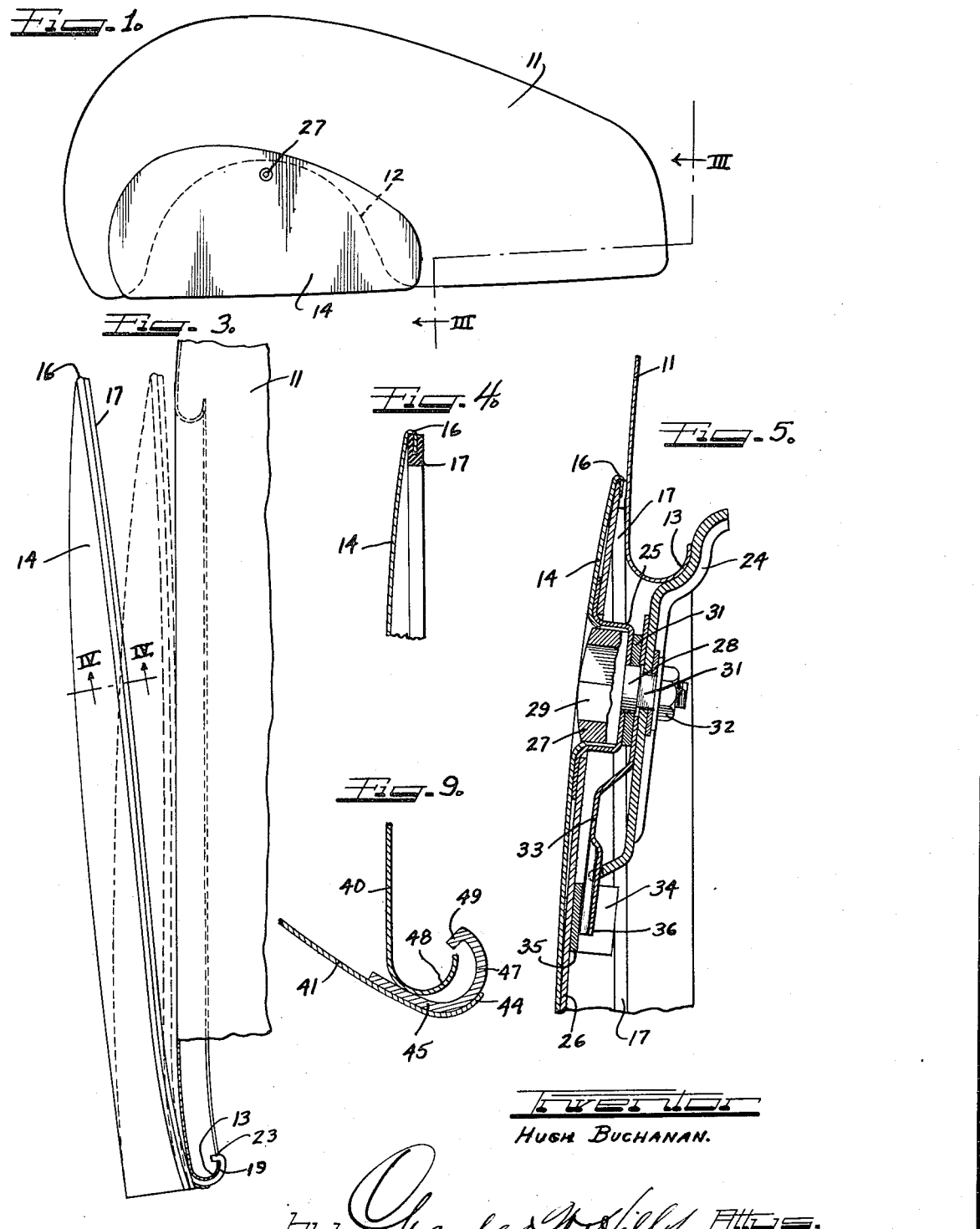

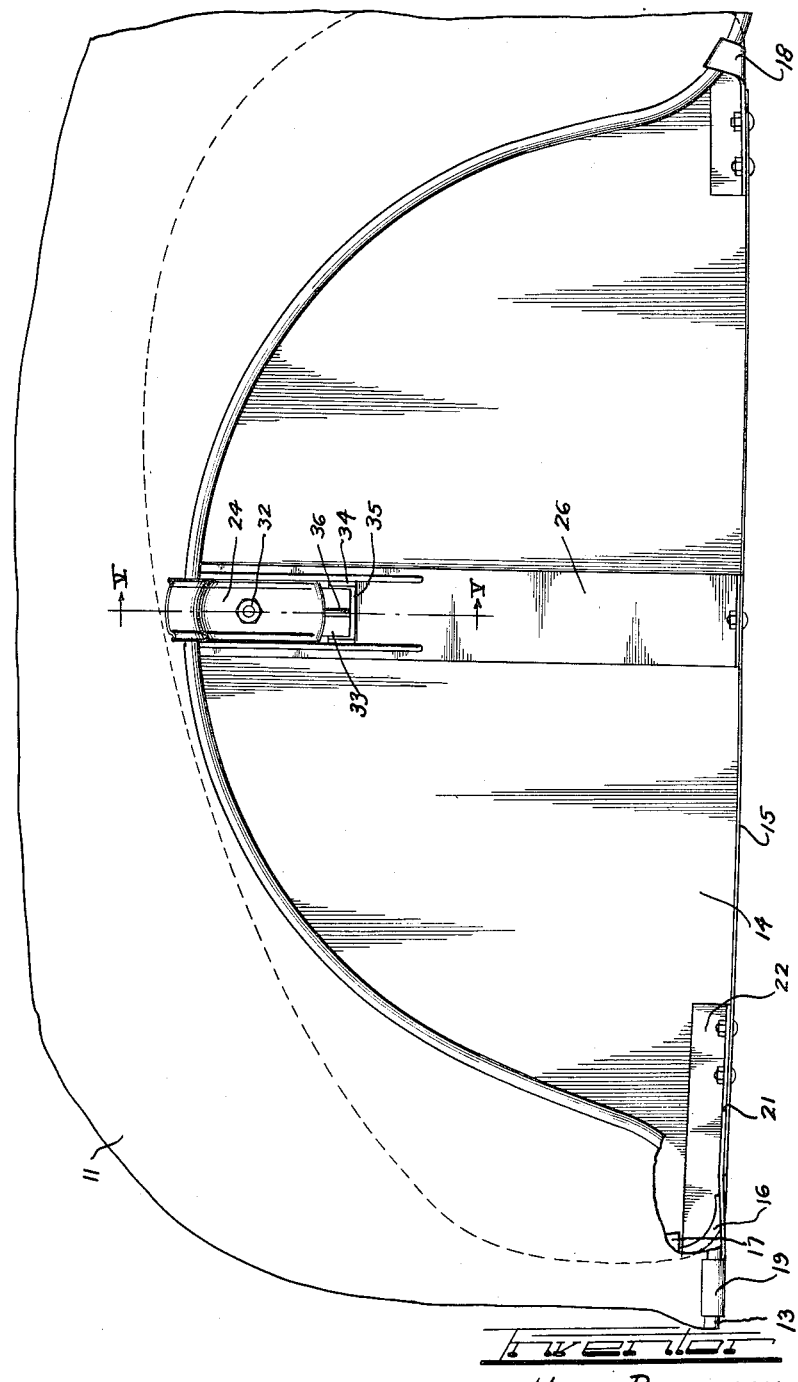

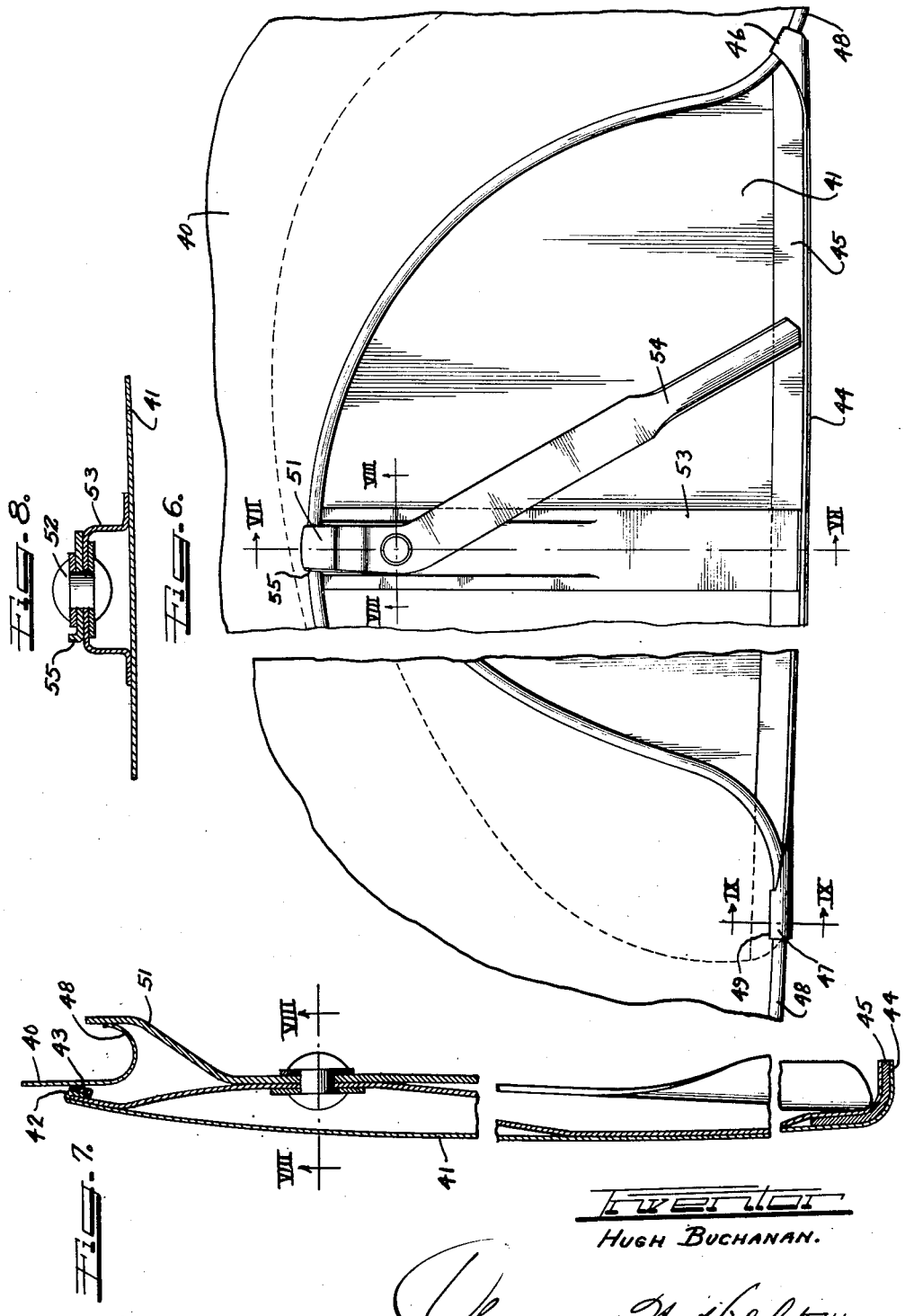

Patented Dec. 31, 1940

2,226,894

UNITED STATES PATENT OFFICE 2,226,894

FENDER SHIELD

Hugh Buchanan, Detroit, Mich., assignor to Houdaille-Hershey Corporation, Detroit, Mich., a corporation of Michigan Application October 8, 1938, Serial No. 233,935

6 Claims. (Cl. 280—153)

This invention relates to means for covering or closing the wheel access opening in the fender of a vehicle or in other types of wheel enclosure. In particular, my invention relates to "fender shields" or "fender skirts," as such devices are known when used in connection with a fender, but this invention is equally applicable to automotive vehicles having a body wide enough to enclose the wheel without the use of fenders and in which the wheel access openings are in the side of the body itself. Bodies having such a width are to be found today only among commercial vehicles, but I wish it to be expressly understood that this invention is equally applicable to such bodies on commercial vehicles and also on private vehicles, if at some time in the future such bodies should come into use on private vehicles. Therefore, while I have referred to my invention as a "fender shield," it is to be clearly understood that this term includes covers for wheel access openings in the side of a body or other wheel enclosing methods as well as for wheel access openings in a fender.

In designing ornamental fender shields or skirts of the type which is adapted to cover the usual wheel access opening in a vehicle fender or body, it is important that the means which is employed to secure the fender shield in desired position be simple and quick to operate both in assembling the fender shield on the vehicle fender and in removing it therefrom. It must also possess a considerable degree of ruggedness when in use and be substantially free from vibration and noise.

It is an object of this invention to provide a novel ornamental fender skirt which possesses the above highly desirable characteristics.

It is a further object of this invention to provide an improved fender skirt which is economical to manufacture and which is rugged and reliable in use.

It is a still further object of this invention to provide a novel means for retaining the entire fender engaging edge portion of an ornamental fender skirt in tight engagement with the fender.

Another object of this invention is to provide a novel means of supporting a fender skirt on a fender, particularly that type of fender having an inturned or rolled edge around the wheel access opening and along the bottom of the fender ahead of and behind the wheel access opening.

Another object of this invention is to provide a fender shield and latching means for the fender shield which do not include any portion or member fitting within the wheel access opening and against the edge of the fender, thus making the fit of the fender shield independent of the exact size of the wheel access opening and making possible the use of the same fender shield assembly on different fenders of the same general contour but having slightly different wheel access openings.

The novel features which I believe to be characteristic of my invention are set forth with particularity in the appended claims. My invention itself, however, both as to its organization and manner of construction, together with further objects and advantages thereof, may best be understood by reference to the following description, taken in connection with the accompanying drawings, in which:

Figure 1 is a side elevational view of a vehicle fender having one embodiment of my novel ornamental fender shield mounted thereon;

Figure 2 is an inside elevational view of the form of the invention shown in Figure 1 as seen from the inside of the fender, showing the back or inner side of the fender shield and the securing means;

Figure 3 is an end elevational view, partly in section, as seen from the line III—III of Figure 1 and looking in the direction of the arrows, showing the fender shield as it is being mounted in position upon the fender;

Figure 4 is a cross-sectional view through the edge of the fender shield, taken on the line IV—IV of Figure 3 and looking in the direction of the arrows;

Figure 5 is a vertical cross-sectional view through the latch and adjacent portions of the fender shield and the fender, the section being taken on the line V—V of Figure 2 and looking in the direction of the arrows;

Figure 6 is an inside elevational view, similar to Figure 2, of a second embodiment of the invention;

Figure 7 is a vertical cross-sectional view through the embodiment of the invention shown in Figure 6, the section being taken on the line VII—VII in Figure 6 and looking in the direction of the arrows;

Figure 8 is a horizontal sectional view of a portion of the invention shown in Figures 6 and 7, the section being taken on the line VIII—VIII and looking in the direction of the arrows; and Figure 9 is a cross-sectional view through a portion of the attaching means of the fender shield shown in Figure 6 and the edge of the fender with which it cooperates, the section being taken on the line IX—IX of Figure 6 and looking in the direction of the arrows and showing the relative position of the fender shield and the fender as they are being disengaged.

The embodiment of the invention shown in Figures 1 to 5 is designed to be mounted upon a conventional "streamlined" automobile fender 11 having an approximately semi-circular wheel access opening whose edge is indicated by the dotted line 12 in Figure 1. The edge of the fender along the bottom and around the wheel access opening 12 is curled back and up so as to form a trough-like reinforcement 13 which is U-shaped in cross section.

The fender shield comprises a sheet metal panel 14 which is large enough to cover the entire wheel access opening 12 as shown in Figures 1 and 2. The lower edge of the panel 14 is approximately straight and is bent back to form a horizontal flange 15 which reinforces that portion of the panel extending across the bottom of the wheel access opening 12. The remainder of the edge of the panel 14, at the ends and around the top, which lies against the side of the fender 11, is folded back, as shown in Figure 4, to form a thin U-shaped reinforcement 16 which serves to hold a rubber edging 17. If desired, the rubber edging 17 may also be cemented in place.

The bottom of the fender shield is provided with two hooks 18 and 19, by means of which the fender shield is detachably connected to the rolled edge 13 of the fender at each side of the wheel access opening 12. The hook 19 at the rear of the fender shield is formed of a piece of sheet metal, the body of which is bent into a shape resembling a piece of angle iron with one flange 21 lying flat on top of and being bolted to the horizontal flange 15 along the bottom of the fender shield panel. The vertical flange 22 lies against the back of the panel 14 and extends to the end of the panel where its end lies under the folded over edge 16 of the panel, the end of the rubber edging 17 being cut away at this point to make room for the end of the flange 22. The horizontal flange 21 extends back under the edge 13 of the fender. The end of the horizontal flange 21 carries the portion of the hook 19 which fits around and operatively engages the rolled edge 13 of the fender. The upper edge of the hook 19 is bent over to form a narrow horizontal flange 23, as shown in Figure 3, which rests on the upwardly directed edge of the underturned edge portion 13 of the fender.

The front hook 18 is generally similar to the rear hook 19 and is also provided with a flange resting on top of the edge of the underturned edge portion of the fender. The flange 23 on the rear hook 19 and a similar flange on the front hook 18 transmit the weight of the fender shield to the fender while the body portion of the hooks 18 and 19 hold the bottom of the fender shield up against the fender.

The top of the fender shield is held against the outside of the fender 11 by means of a latch shown in Figures 2 and 5. The latch mechanism is carried by a sheet metal cup 25 having a flange around its mouth welded to the front of the stay 14. The cup 25 fits over a hole in the panel 14, the edges of the panel around the hole being flanged back into the cup in order to hide the raw edge of the sheet metal. The cup 25 is also supported by a flat metal stay 26 extending up in back of the panel and the flange on the cup 25 and having an aperture through which the body of the cup projects. The bottom of the stay 26 is bolted to the flange 15 on the bottom of panel 14, and the top of the stay 26 fits up under the folded edge 16 at the top of the panel 14.

The cup 25 forms a socket for the head 27 of a rotatable stud 28 which carries the latch member 24. The exterior of the head 27 of the stud is cylindrical so that it may rotate freely, and the face of the head is provided with a square recess 29 adapted to receive the square end of a wrench by means of which the stud 28 may be rotated. The stem of the stud 28 passes through an aperture in the back of the cup 25 and through a washer 31 which serves to reinforce the back of cup. In back of the washer 31, the stem of the stud 28 is formed into a square portion 31 upon which the latch member 24 is mounted, the latch member being held in place by a nut 32 screwed on to the threaded end of the stud 28.

The stud 28 also serves to hold in place a sheet metal spring 33 having one end lying between the latch member 24 and the washer 31 on the back of the sheet metal cup, the end of the spring 33 having an aperture through which the stud 28 extends. The other end of the spring 33 lies between the bent up ends 34 of a U-shaped bracket 35 welded to the back of the stay 26 and is thus prevented from swinging around. The back of the spring 33 is pressed up to form a ridge or rib 36 which resiliently engages a notch in the lower end of the latch member 24 and thus releasably holds the latch member 25 in its operative position.

The panel 14 of the fender shield is not formed to fit flat against the side of the fender 11 without being strained. Instead, it is formed so that, when it is applied to a fender as shown in Figure 3, the ends of the fender shield near the bottom will first fit up against the fender and the remainder of the edge of the fender shield will have to be bent in slightly before contact is established with the side of the fender 11. The latch 24 is arranged so that, when the top of the fender shield is pressed tight against the side of the fender, it will be held in this position by the latch. This arrangement insures that the entire edge of the fender shield will be in tight engagement with the side of the fender. No exact formulas can be given for the shape of fender shield panel which will give the best results, as apparently this can be determined most conveniently by experiment, but in general it is necessary that each portion of the edge of the fender shield, except in the immediate vicinity of the latch, be convex relative to the portion of the fender against which it is to fit. This means that if a portion of the side of the fender is flat, the portion of the edge of the fender shield panel which is to fit there should be slightly convex; if a portion of the side of the fender is convex, the portion of the edge of the fender shield panel 14 which is to fit against it should be concave but should have less curvature or a greater radius of curvature than the fender; and if a portion of the side of the fender 11 is concave, the portion of the edge of the fender shield panel 14 which is to fit against it should be convex and the curvature of the edge of the fender shield should be greater than or the radius of curvature should be less than that of the fender. In the immediate vicinity of the latch member 24 the relation between the curvature of the edge of the fender shield panel 14 and the face of the fender 11 is exactly the opposite of that defined above, that is, at that point the fender shield is concave relative to the side of the fender.

A second embodiment of the invention is shown in Figures 6, 7, 8 and 9. This embodiment of the invention comprises a sheet metal panel 41 adapted to fit against the side of a fender 40 in the same manner as the panel 14 in the first embodiment of the invention. The edge 42 of the panel at the ends and around the top is folded over and secures a rubber edging 43. The bottom edge 44 of the panel is curled under horizontally and is reinforced with a strip of sheet metal 45 curved to fit it and riveted or spot welded in place. The reinforcing piece 45 is somewhat similar to a round cornered angle bar with one flange horizontal and the other flange vertical and lying against the back of the main portion of the panel 41. The part of the reinforcing strip 45 which lies against the back of the panel 41 extends to the ends of the fender shield, and its ends are secured by the folded over edge 42 of the fender shield panel 41.

The part of the reinforcing strip 45 which lies flat on top of the flange 44 along the bottom of the fender shield panel 41 extends back beyond the edge of the flange 44 near both ends of the fender shield and is formed into hooks 46 and 47 which fit around under the rolled edge portion 48 of the fender. The rear hook 47 is provided with a sharply inturned flange 49 (as shown in Figure 9) which hooks over the upwardly directed edge of the rolled edge portion 48 of the fender. The front hook 46 is similarly provided with a short flange which fits on top of the edge of the rolled edge portion 48 of the fender at the front end of the fender shield. The flange 49 on the rear hook 47 and the similar flange on the front hook 46 serve to carry the weight of the fender shield, and the main portions of the hooks 46 and 47 serve to hold the bottom of the fender shield up against the fender.

As may be seen in Figure 6, the bases of the hooks 46 and 47 extend a considerable distance along and form a part of the reinforcing strip 45, thus making the end portions of the reinforcing strip 45 U-shaped in cross section and greatly enhancing its rigidity. This construction allows the reinforcing strip 45 to be made of a much lighter gauge metal than would otherwise be the case. In fact, the increase in rigidity provided by this construction is great enough in some cases, particularly those in which both the front and rear hooks extend a considerable distance along the lower edge of the fender, to allow the hooks to be made out of the material of the panel 41 itself instead of being made integral with a separate reinforcing bar or strip 45, the strip in such cases being completely omitted. In other cases, the central portion only of the strip may be omitted, as shown in the embodiment of the invention illustrated in Figure 2.

The top of the fender shield panel 41 is held in against the side of the fender 40 by a latch 51 secured by a pivot 52 to a stay 53 on the back of the panel. The lower end of the stay 53 fits on and is spot welded to the top of the reinforcing strip 45 along the bottom of the panel, and the upper end of the stay fits in under the folded-over edge 42 at the top of the panel. In addition, the stay 53 may also be spot welded to the panel.

The latch 51 is provided with an integral handle 54, which is long enough to extend down below the bottom of the fender shield panel 41 and which is placed at such an angle to the operative part of the latch 51 that its end will be swung up behind the panel 41 when the latch itself is swung up behind the underturned edge 48 of the fender 40 at the top of the wheel access opening. The handle 54 is also made resilient enough so that when it is swung up entirely behind the panel 41, its end will swing forward, as shown in Figure 7, and press against the upright flange of the reinforcing strip 45 and lie on top of the horizontal flange thereof. This will prevent any accidental movement of the latch 51 while allowing it to be readily operated by reaching up under the bottom of the fender shield and bringing the handle back and swinging it sideways.

In order to facilitate the engagement of the latch 51 with the back of the rolled edge of the fender, the edge 55 of the latch which first comes into engagement with the edge of the fender when the latch is being swung to its operative position is formed into a sloping flange which acts as a cam surface for guiding the latch 51 up into position.

As is the case in the embodiment of the invention shown in Figures 1 to 5, the panel 41 in this second embodiment of the invention is not formed to fit against the side of the fender without being strained, but instead is made curved with respect to the side of the fender as described above in connection with the first embodiment of the invention. The method of applying the fender shield is therefore the same. The method of removing both forms of the invention is illustrated in Figure 9, and comprises releasing the latch at the top of the fender shield and swinging the fender shield out at a considerable angle to the vertical. If the bottom of the fender shield is then held up against the rolled edge 48 of the fender, the flange 49 on the rear hook 47 will be out of engagement with the edge of the rolled edge portion 48 and the rear portion of the fender shield can be slid down and back and unhooked from the fender. Then the entire fender shield can be slid forward a few inches and the front hook 46 similarly disengaged.

Attention is particularly directed to the fact that, in the second embodiment of the invention illustrated in Figures 6 to 9, the rear hook 47 engages the underturned rolled edge portion 48 of the fender 40 at a point which is entirely in back of the wheel access opening and that the character of the engagement would be the same irrespective of whether the wheel access opening extended back as far as shown in the figure or not. Also, as shown in Figure 7, the latch 51 engages the underturned rolled edge 48 at the top of the wheel access opening with a vertical surface and that the character of the engagement would be the same irrespective of whether the wheel access opening were as high as shown in the figure or not. Thus, a single design of fender shield assembly with the same hooks and the same latch may be used with slightly different fenders having different wheel access openings but having the same general contour, the fore and aft position of the fender shield on the fender being determined in each case by the front hook 46 which is designed to fit the underturned rolled edge portion 48 of the fender where it begins to curve up to form the wheel access opening. If desired, both the front and rear ends of the fender shield may be provided with hooks similar to the hook 47 to engage the edge of the fender entirely beyond the wheel access opening.

From the above description, it will be apparent that I have provided an extraordinarily simple means for securing an ornamental fender shield to a vehicle fender in such a way that it will fit tightly all around its periphery. It will also be apparent that I have provided a fender shield which will fit tightly irrespective of slight variations in the size of the wheel access opening in the fender and that the same fender shield may even fit slightly different styles of fenders, such as are often found on different models of cars of the same make or manufacture. It will also be apparent that I have provided a means of mounting a fender shield upon a fender which does not involve the use of any heavy reinforcing bars but which may be made entirely of sheet metal and even, in some cases, from the sheet metal of the fender shield panel itself.

While I have shown only two embodiments of my invention, it will, of course, be understood that I do not wish to be limited thereto, as many other modifications or embodiments may be made, and I therefore contemplate by the appended claims to cover all such modifications as fall within the true spirit and scope of my invention.

I claim as my invention:

1. In combination, a fender having a depending side with a wheel access opening and having a continuous underturned margin, said underturned margin extending along the bottom of said side on at least one side of said wheel access opening and curving up around said wheel access opening and being approximately semicircular in cross section, and a fender shield comprising a sheet metal panel having a lower edge spanning the bottom of said opening and a sheet metal hook on said lower edge having a body portion extending around under said underturned margin at said side of said opening and having an inturned lip, the body portion of said hook extending longitudinally of said panel a substantial distance beyond said inturned lip and under the upcurving portion of said underturned margin and said inturned lip having the portion next to said body portion resting on the edge of said underturned margin.

2. A fender shield for closing the wheel access opening in the side of a fender having a continuous underturned margin extending along the bottom of said side on at least one side of said wheel access opening and curving up around said wheel access opening, said fender shield comprising a sheet metal panel having a lower edge spanning the bottom of said opening and a sheet metal arm on said lower edge having a body portion adapted to extend under said underturned margin at said side of said opening and having an inturned lip, the body portion of said arm being curved in cross section and extending longitudinally of said panel a substantial distance beyond said inturned lip and being adapted to lie under and behind the upcurving portion of said underturned margin, and the portion of said lip next to said body portion being adapted to rest on the edge of said underturned margin.

3. A fender shield for closing the wheel access opening in the side of a fender having a continuous underturned margin approximately semi-circular in cross section extending above the bottom of said side on at least one side of said wheel access opening and curving up around said wheel access opening, said fender shield comprising a sheet metal panel having a lower edge adapted to span the bottom of said opening and terminating at one end at the point where said underturned margin starts to curve up around said wheel access opening, said fender shield also comprising a hook on the back of said panel adapted to extend in under the upcurving portion of said underturned margin tangentially to a horizontal plane and then extend up behind said underturned margin, and a longitudinally sloping lip on the end of said hook adapted to rest on the edge of said upcurving portion of said underturned margin.

4. A fender shield assembly for closing a wheel access opening in a substantially vertical side wall of a fender, comprising a sheet metal panel adapted to cover said opening and to fit against said side wall along a line extending around but spaced from said opening, rigid means for detachably securing the bottom of said panel to the bottom of said fender side wall at both sides of said opening, said rigid means having downwardly facing surfaces for engaging upwardly facing surfaces on said fender and for positively supporting the entire weight of said fender shield, said rigid means also having upwardly facing surfaces for engaging downwardly facing surfaces on said fender for positively preventing upward movement of said fender shield, and a latch near the top of said panel constructed and arranged to extend up behind said fender side wall above said opening and to engage said fender only on a substantially vertical portion of the surface thereof, said fender shield thus being constructed so that every point of contact thereof with said fender above the bottom thereof is on a substantially vertical surface having the result that the fit of said fender shield on said fender is independent of the exact size and shape of said opening or of the exact vertical distance between the bottom of said fender side wall and anything on said fender above the bottom thereof.

5. In combination, a fender having a depending side with a wheel access opening and having a continuous inturned margin, said inturned margin extending along the bottom of said side on at least one side of said wheel access opening and curving up around said wheel access opening, and a fender shield comprising a sheet metal panel having a lower edge spanning the bottom of said opening, an arm secured to said lower edge and extending under said inturned margin along the bottom of said side of said fender to a point beyond the end of said panel, and a hook on the end of said arm fitting around and over said inturned margin at said point beyond said end of said panel.

6. A fender shield comprising a sheet metal panel adapted to cover the wheel access opening in the side of a fender having an inturned lower edge at the bottom at one side of said opening, an arm secured to the lower edge of said panel and extending longitudinally to a point beyond the end of said panel, said arm being adapted to lie at least partly under said inturned lower edge of said fender and having a hook portion at the end adapted to rest on top of said inturned lower edge at said point beyond said end of said panel.

HUGH BUCHANAN.